United States Patent
Carritte et al.

(10) Patent No.: US 10,272,890 B2
(45) Date of Patent: Apr. 30, 2019

(54) PNEUMATIC PANIC BRAKE ASSIST

(71) Applicant: Bendix Commercial Vehicle Systems LLC, Elyria, OH (US)

(72) Inventors: Timothy Carritte, Avon Lake, OH (US); Mark A. Bennett, LaGrange, OH (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 38 days.

(21) Appl. No.: 15/616,255

(22) Filed: Jun. 7, 2017

(65) Prior Publication Data
US 2018/0354475 A1    Dec. 13, 2018

(51) Int. Cl.
| | |
|---|---|
| *B61F 1/00* | (2006.01) |
| *B60T 8/176* | (2006.01) |
| *B60T 7/04* | (2006.01) |
| *B60T 7/20* | (2006.01) |
| *B60T 8/17* | (2006.01) |
| *B60T 8/171* | (2006.01) |
| *B60T 8/1755* | (2006.01) |
| *B60T 8/1761* | (2006.01) |
| *B60T 8/34* | (2006.01) |
| *B60T 8/38* | (2006.01) |
| *B60T 8/36* | (2006.01) |
| *B60T 13/26* | (2006.01) |
| *B60T 13/68* | (2006.01) |

(52) U.S. Cl.
CPC .............. *B60T 8/176* (2013.01); *B60T 7/042* (2013.01); *B60T 7/20* (2013.01); *B60T 8/171* (2013.01); *B60T 8/1708* (2013.01); *B60T 8/1755* (2013.01); *B60T 8/1761* (2013.01); *B60T 8/342* (2013.01); *B60T 8/362* (2013.01); *B60T 8/3675* (2013.01); *B60T 8/38* (2013.01); *B60T 13/268* (2013.01); *B60T 13/683* (2013.01); *B60T 2201/03* (2013.01)

(58) Field of Classification Search
CPC ... B60G 17/01; B60T 7/12; B60T 7/22; B60T 8/1708
USPC .............................. 701/38, 70; 303/7, 10, 11
See application file for complete search history.

(56) References Cited

U.S. PATENT DOCUMENTS

| | | |
|---|---|---|
| 3,866,983 A | 2/1975 | Kondo |
| 5,464,278 A | 11/1995 | Camm |
| 5,669,673 A | 9/1997 | Reuter |
| 5,727,854 A | 3/1998 | Pueschel et al. |
| 5,984,429 A | 11/1999 | Nell et al. |
| 6,109,703 A | 8/2000 | Takahashi |
| 6,217,129 B1 | 4/2001 | Ganzel |

(Continued)

OTHER PUBLICATIONS

Bendix, "Air Brake Handbook", 92 pages.

*Primary Examiner* — Christopher P Schwartz
(74) *Attorney, Agent, or Firm* — Fay Sharpe LLP (57) ABSTRACT

When a brake system on a commercial vehicle, lateral acceleration and/or yaw of the vehicle are monitored and compared to a first predetermined threshold. If the first predetermined threshold is exceeded, a precharge command is sent to the brake system to precharge one or more air chambers by temporarily deactivating a modulator valve and activating an antilock traction relay valve in order to charge the air chambers up to a level permitted by the modulator valve. Upon detecting a panic braking event, a command signal is sent to the brake system to release the precharged air to facilitate braking.

26 Claims, 6 Drawing Sheets

(56) References Cited

U.S. PATENT DOCUMENTS

| | | | |
|---|---|---|---|
| 6,474,753 B1 * | 11/2002 | Rieth | G05G 1/38 |
| | | | 180/271 |
| 6,962,396 B2 | 11/2005 | Faye et al. | |
| 7,018,004 B2 * | 3/2006 | Chen | B60T 7/22 |
| | | | 188/1.11 R |
| 7,234,786 B2 * | 6/2007 | Mori | B60T 8/4872 |
| | | | 303/11 |
| 7,434,894 B2 | 10/2008 | Toelge | |
| 7,604,303 B2 * | 10/2009 | Cole | G05G 1/38 |
| | | | 303/191 |
| 8,577,550 B2 | 11/2013 | Lu et al. | |
| 9,132,812 B2 | 9/2015 | Treppenhauer et al. | |
| 9,393,937 B2 | 7/2016 | Epple | |
| 2004/0024505 A1 * | 2/2004 | Salib | B60G 17/0162 |
| | | | 701/38 |
| 2005/0021226 A1 * | 1/2005 | Kustosch | G01C 21/3697 |
| | | | 701/466 |
| 2011/0131974 A1 | 6/2011 | Brueggemann et al. | |
| 2011/0248560 A1 | 10/2011 | Vollert et al. | |
| 2012/0312645 A1 | 12/2012 | Frashure et al. | |
| 2014/0067220 A1 * | 3/2014 | Seiler | B60T 7/12 |
| | | | 701/70 |
| 2014/0306515 A1 | 10/2014 | Claussen et al. | |
| 2015/0239441 A1 * | 8/2015 | Klostermann | B60T 8/1708 |
| | | | 303/7 |
| 2015/0239448 A1 | 8/2015 | O'Meachair et al. | |
| 2015/0283985 A1 | 10/2015 | Korthals et al. | |
| 2015/0336548 A1 * | 11/2015 | Morselli | B60T 8/1708 |
| | | | 701/70 |
| 2015/0367857 A1 * | 12/2015 | Kozuka | B60W 40/13 |
| | | | 701/70 |
| 2015/0375724 A1 | 12/2015 | Ganzel | |

\* cited by examiner

PNEUMATIC PANIC BRAKE ASSIST

BACKGROUND

The present application finds particular application in commercial vehicle brake systems. However, it will be appreciated that the described techniques may also find application in other vehicle safety systems, or other vehicle braking systems.

When a driver intends to apply full brake pressure as quickly as possible, it can take a long time for the driver to trigger the control signal (via the brake pedal), and then additional time to charge the brake system by filling the air brake chambers. Due to length of a commercial vehicle and the pneumatic tubing required to reach from the brake control valves to the wheel end, today's typical air brake system may take up to 0.5 seconds to actuate the brakes at the wheel ends from the time of the initiation of the braking action. A vehicle controller often receives a brake pressure request prior to control pressure being requested. If the target control pressure is held back until the actual pressure request is received, then vehicle deceleration is delayed.

The present innovation provides new and improved systems and methods that facilitate precharging a brake system using a reduced stability threshold in order to improve brake response time, which overcome the above-referenced problems and others.

SUMMARY

In accordance with one aspect, a system that facilitates pre-charging an air brake system on a commercial vehicle comprises accelerometer sensor that detects stability input value of the vehicle, and a processor configured to compare the stability input value of the vehicle to a first predetermined threshold. When the stability input value of the vehicle exceeds the first predetermined threshold, the processor sends a precharge command to the brake system to charge the brake system.

In accordance with another aspect, a processor that facilitates pre-charging an air brake system on a commercial vehicle is configured to compare a stability input value of the vehicle to a first predetermined threshold, and when the stability input value of the vehicle exceeds the first predetermined threshold, send a precharge command to the brake system to charge the brake system.

In accordance with another aspect, a method of precharging an air brake system on a commercial vehicle comprises comparing a stability input value of the vehicle to a first predetermined threshold, and when the stability input value of the vehicle exceeds the first predetermined threshold, sending a precharge command to the brake system to charge the brake system.

In accordance with another aspect, an apparatus that facilitates pre-charging an air brake system on a commercial vehicle comprises means for detecting an amount of stability input value of the vehicle, means for comparing the stability input value of the vehicle to a first predetermined threshold, and means for sending a precharge command to the brake system to charge the brake system when the stability input value of the vehicle exceeds the first predetermined threshold.

One advantage is that brake response time is improved.
Another advantage is that vehicle stability is improved.
Another advantage is that brake component wear is reduced.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described systems and methods, which facilitate pre-charging the brake system based on stability system limits set lower than automated intervention limits. In one embodiment, driver intent such as panic braking is determined as input using a travel sensor on a brake valve of a commercial vehicle. Distance and actuation speed sensed by the sensor can be used to infer that the driver intends to apply full brake pressure as in the case of a panic brake application. This input, combined with measured lateral acceleration and/or yaw above a predetermined threshold that is lower than an intervention threshold is used to trigger brake precharging. Through the use of electronic valves, such as an electronic traction valve and electronic brake modulators, pressure can be applied to the wheel ends more quickly than can be achieved using a conventional pneumatic driver control signal. By providing quicker application of wheel end brake pressure, a faster response by the brakes and a faster reduction in vehicle speed is achieved. The application rate of the foot brake valve can be used as a determinative factor in the described method of control. Reduction of pressure via the foot brake valve (e.g., when the driver releases the brake pedal), as detected by the travel sensor, is also detected to facilitate reducing brake pressure and transferring direct pressure control back to the driver.

Figure 1:
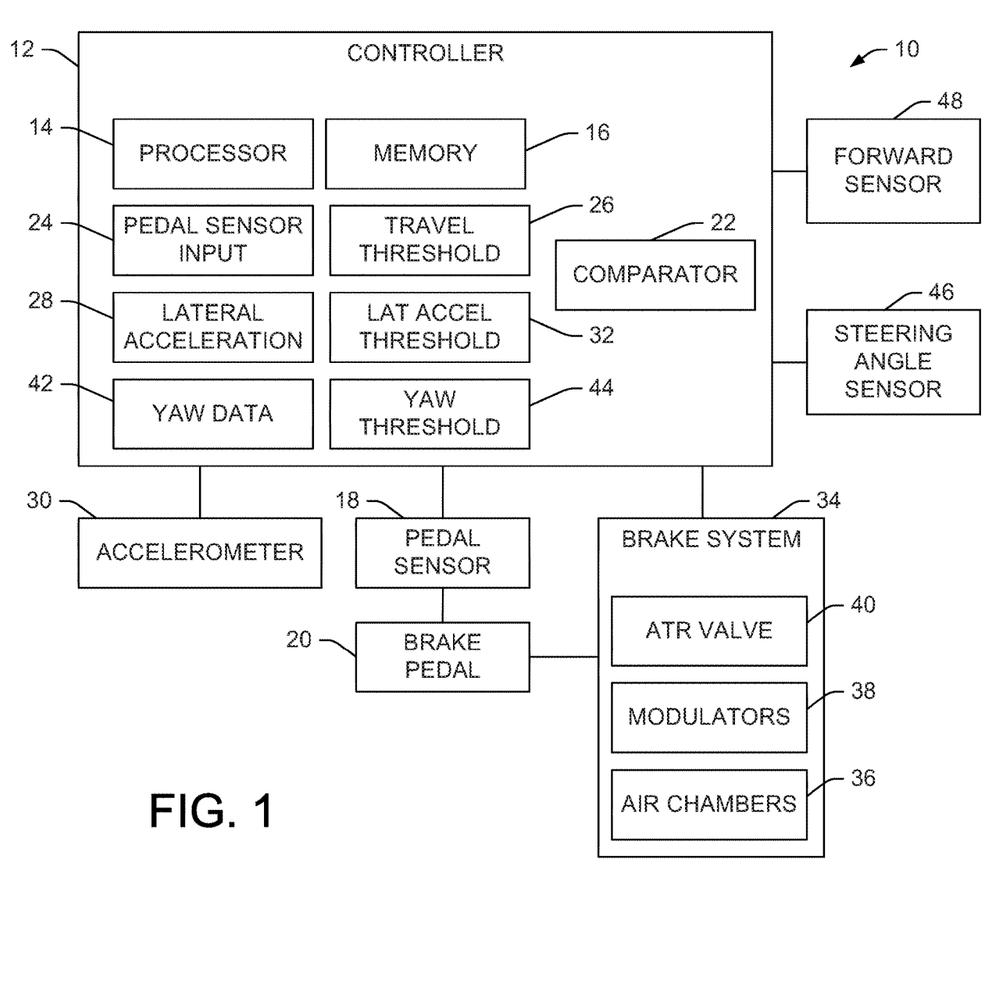
FIG. 1 illustrates a system that facilitates precharging a brake system in a commercial vehicle for stability control in accordance with one or more features described herein.

FIG. 1 illustrates a system 10 that facilitates precharging a brake system in a commercial vehicle for stability control in accordance with one or more features described herein. The system includes a brake controller 12, which comprises processor 14 that executes, and a memory 16 that stores, computer-executable instructions (e.g., modules, routines, programs, applications, etc.) for performing the various methods, techniques protocols, etc., described herein, including but not limited to detecting a panic braking event and determining a lateral acceleration or yaw of the vehicle in order to trigger precharging of the brake system to provide brake pressure to stabilize the vehicle. The memory 16 may include volatile memory, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 14. Additionally, "module," as used herein denotes a set of computer-executable instructions (e.g., a routine, sub-routine, program, application, or the like) that is persistently stored on the computer-readable medium or memory for execution by the processor The system further includes a pedal sensor 18 that detects a pedal event (i.e., movement) of a pedal in the vehicle. In the various examples described herein, the pedal is a brake pedal 20. However, the pedal may also be an accelerator pedal in accordance with one or more aspects described herein. In one embodiment, the pedal event is a rapid actuation of the brake pedal. In another embodiment, the pedal event is a deactivation of an accelerator pedal (i.e., such as occurs when a driver rapidly takes his foot off the accelerator pedal prior to applying the brakes).

In one embodiment, the pedal sensor 18 is a travel sensor, which detects a distance and rate of travel of the brake pedal 20 when applied during a braking event. The travel sensor is coupled to a brake valve associated with the brake pedal. The controller comprises a comparator module 22 that, when executed by the processor, compares pedal sensor input 24 (i.e., rate of travel) to a predetermined travel rate threshold value 26 (e.g., greater than 5 inches/second) to determine whether the driver is panic braking. If the rate of travel of the brake pedal is above the travel rate threshold value, then the pedal event is deemed to be a panic braking event. According to an example, a change in rate of pressure delivered by the brake valve is determined. For instance, an initial brake pressure of above, e.g., 15 pounds per square inch may be identified as a panic brake situation. Rate of change of pressure in this example can be, e.g., 50 psi per second. Alternatively, a range of values can be based on a rated average where the initiation of precharge begins at a value above the average rate of travel.

In order to provide precharged brake availability, the comparator module 22 is also configured to compare a stability input value such as e.g., lateral acceleration information 28 from a vehicle accelerometer 30 to a predetermined lateral acceleration threshold value 32 that is set below a braking intervention threshold where automatic braking is initiated. The lateral acceleration threshold may be set to, e.g., 50%-80% of the automatic braking intervention threshold. For example, the braking intervention threshold may be set to 0.3 G, such that if the vehicle experiences more than 0.3 G lateral acceleration, then automated braking is initiated. In this case, the lateral acceleration threshold is set to a value in the range of 50%-80% of 0.3 G, i.e. 0.15 G-0.24 G. If the lateral acceleration detected by the accelerometer is greater than the lateral acceleration threshold value, then the controller 12 generates and transmits a precharge signal to a brake system 34 on the vehicle to cause the brake system 34 to fill so that air is available at the modulators close to the wheel end (the modulators fill the air chambers 36 after they are put in the "deliver" state) in advance of the panic braking event. Once the lateral acceleration threshold is above the braking intervention threshold, the air is released for braking.

In order to effectuate precharging, the controller 12 sends a brake pressure precharging signal or command that places the antilock brake system (ABS) modulators 38 into a hold state, and an antilock traction relay (ATR) valve 40 in an energized state, thus placing the brake system into a precharged state prior to an event that can lead to a brake application. Situations that warrant precharging the brake pressure include but are not limited to: collision mitigation with input from radar or camera (not shown), where the threshold for precharge can be lower than a threshold for brake pressure control; electronic park at speed, where the system can precharge if the parking brake is actuated while moving; driver release of the throttle pedal at a certain rate or steering the steering wheel at a certain rate; and/or roll stability control (RSP) resulting in brake control, where the system can precharge based on reduced roll limits or thresholds as described herein.

Once precharge air is available according to one of the situations above, a panic brake assist function monitors the movement of the brake valve by the driver (i.e., via the travel sensor). If the application rate of the foot pedal on the brake valve is higher than a predetermined threshold, the system infers "panic braking" is occurring and makes available the precharged air to ensure a faster application of the brake system. In this manner, the braking system is prepared to brake by allowing air to reach the modulators prior to a braking event that is initiated by monitoring certain vehicle characteristics and the speed of the brake pedal application. One benefit of brake precharge is much faster wheel end pressure application in any situation where the likelihood of a brake application can be determined prior to actual brake control pressure being sent.

In another embodiment, the comparator module 24 is configured to compare a stability input such as, e.g., yaw information 42 from the yaw rate sensor 48 to a predetermined yaw threshold value 44 that is set below a braking intervention threshold where automatic braking is initiated. The yaw threshold may be set to, e.g., 50%-80% of the automatic braking intervention threshold. In one example, the yaw threshold is set to be 20% below the value that will trigger stability intervention. Yaw is calculated against the existing travel direction of the vehicle. The system detects yaw error between the desired direction of travel from a steering angle sensor 46 and the actual yaw of the vehicle from yaw rate sensor 48. If the yaw error calculated is greater than the yaw threshold value then the controller 12 generates and transmits a precharge signal to a brake system 34 on the vehicle to cause air to be available at the modulators 38 in advance of the panic braking event.

In another embodiment, the system comprises a forward sensor 48 (e.g., a camera sensor, a radar unit, etc.) that monitors a forward vehicle. The processor is configured to determine a distance and/or time-to-collision between the host vehicle and a forward vehicle. The following distance and/or following time can be compared by the comparator module 24 to a predetermined threshold below which analysis of the stability input is triggered. If the following time or distance is below the predetermined threshold, and the stability input also meets the herein-described predetermined threshold criteria, the brake circuit is precharged. Precharged air is then vented or used to apply the brakes as a function of additional stability input analysis (See FIG. 4).

In another embodiment, the pedal sensor is a pressure sensor that detects an amount of pressure applied to the pedal, which can be compared to a pressure threshold value to determine whether the driver is "panic" braking. This information is then used in conjunction with an over-threshold input from the accelerometer to trigger a precharging signal to be sent form the controller to the brake system.

Figure 2:
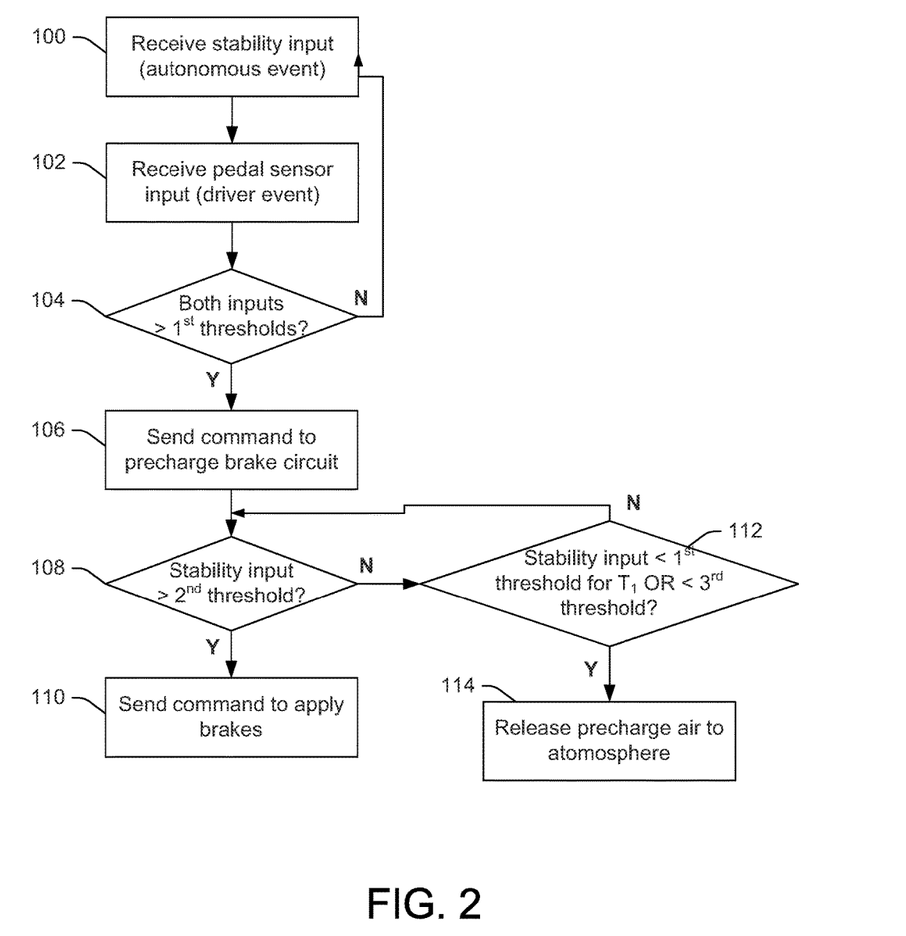
FIG. 2 illustrates a method for precharging a brake system in a commercial vehicle for stability control in accordance with one or more features described herein.
Figure 3:
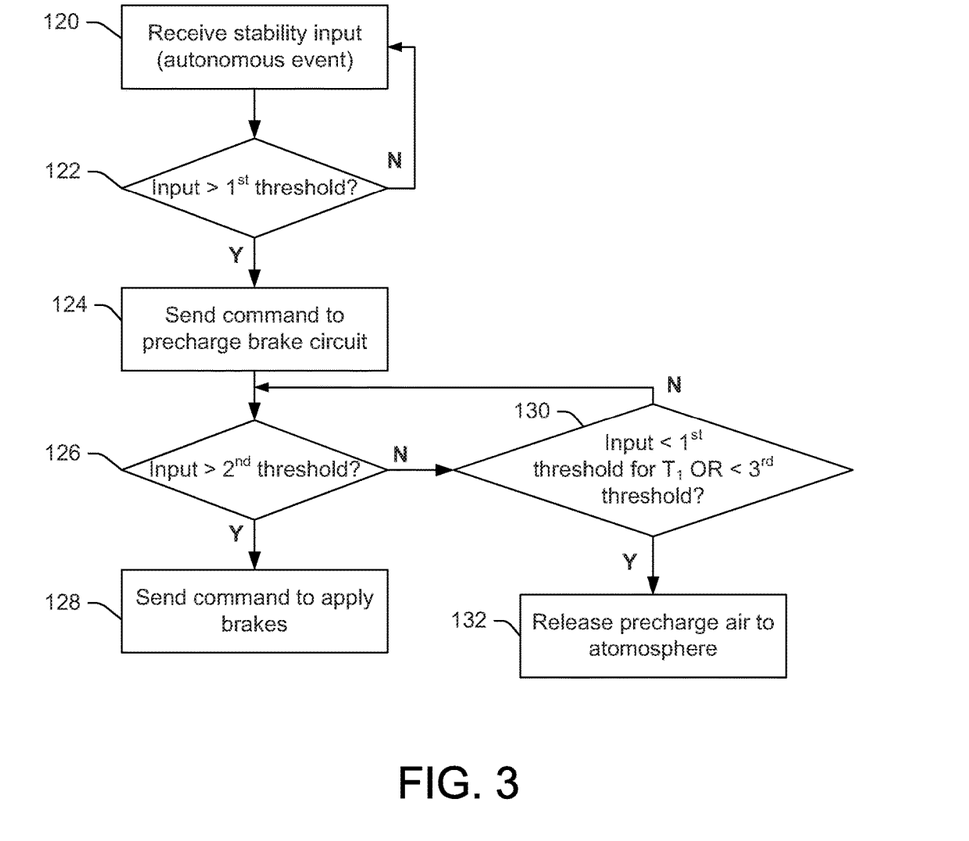
FIG. 3 illustrates a method for precharging a brake system in a commercial vehicle for stability control in accordance with one or more features described herein.
Figure 4:
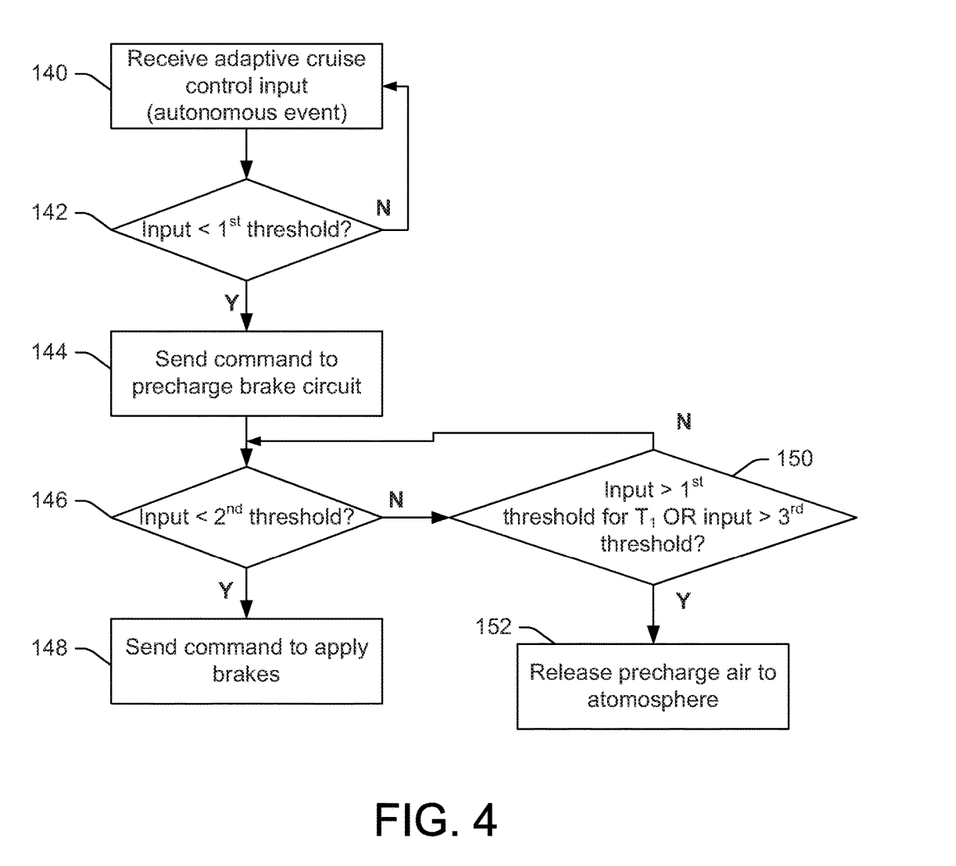
FIG. 4 illustrates a method for precharging a brake system in a commercial vehicle for stability control in accordance with one or more features described herein.

FIGS. 2-4 illustrate various methods of performing brake circuit precharging, which may be effected by the system of FIG. 1 and the various components thereof (e.g., the processor, memory, comparator module, etc.), as will be understood by those of skill in the art.

FIG. 2 illustrates a method for precharging a brake system in a commercial vehicle for stability control in accordance with one or more features described herein. At 100, stability input information (e.g., lateral acceleration information, yaw information, etc.) is received from an accelerometer. At 102, pedal actuation information is received. The brake pedal actuation information may comprise distance and/or rate of travel information for a brake or acceleration pedal in the vehicle, such as can be collected by a travel sensor coupled to a brake valve associated with the brake pedal. In another example the pedal actuation information is provided by a pressure sensor and used to determine a change in force applied to the brake or accelerator pedal. At 104, the rate of travel of the pedal is compared to a first predetermined brake pedal rate threshold, and the stability input is compared to a first predetermined stability input threshold. Rate of travel of the pedal above the first predetermined brake pedal rate threshold is indicative of a panic braking event. If the rate of travel of the pedal does not exceed the first predetermined brake pedal rate threshold, or the stability input does not exceed the first predetermined stability input threshold, then the method reverts to 100 for continued monitoring.

If the rate of travel of the pedal exceeds the first predetermined brake pedal rate threshold and the stability input first exceeds the first stability input threshold, then at 106 a command is sent to precharge the brake circuit. At 108, the stability input is compared to a second predetermined stability input threshold, wherein the respective second predetermined threshold is higher than the first predetermined thresholds. If the the stability input exceeds the second stability input threshold, then at 110, a command is sent to cause the brakes to be applied.

If the stability input does not exceed the second predetermined stability input threshold, then at 112, a determination is made regarding whether the stability input value has fallen below the first predetermined stability input threshold and remained there for a predetermined time period (T1) (e.g., 2 seconds or some other suitable time period), or whether the stability input value has fallen below a third predetermined stability input threshold that is lower than the first stability input predetermined threshold. If either of these conditions is met, then at 114, precharged air is released to the atmosphere. If neither condition is met, then the method reverts to 108 for continued monitoring.

The pre-charged state occurs when a traction valve is activated and modulators (see FIG. 4) are set to hold state. Air is provided directly from an air reservoir to the traction valve and does not require brake pedal activation. A "normal state" occurs when the traction valve is deactivated, and the modulator is set to build state. A fully actuated state (e.g., for automatic braking) occurs when the traction valve is activated, modulators are set to build state, and brake chambers have pressure, thus generating braking force.

The brake precharge command causes air transmission lines, valves, modulators in the brake system to be precharged to make air available for braking by placing ABS modulator valve(s) in a "hold" state while activating an antilock traction valve by opening the valve from supply to delivery, thus precharging the brake system at the modulator valve which are located nearest the wheel end and brake assemblies, thus shortening the time to actually apply the brakes if autonomous braking or driver intervention is necessary.

To exit precharge, the traction valve deactivates and exhausts the air to atmosphere. Precharge can be held for a predetermined time after the detection of yaw/lateral acceleration at or above the threshold level begins, such as two seconds. If yaw and/or lateral acceleration conditions continue to be met, the precharge state is maintained. If values go below about 50% of threshold for a time greater than e.g., 2 seconds, the system exits precharge.

When using lateral acceleration in conjunction with an identified panic braking event, the lateral acceleration threshold may be set to, e.g., 50%-80% of the automatic braking intervention threshold. For example, the braking intervention threshold may be set to 0.3 G (or some other predetermined lateral intervention threshold), such that if the vehicle experiences more than 0.3 G lateral acceleration, then automated braking is initiated. In this case, the lateral acceleration threshold is set to a value in the range of 50%-80% of 0.3 G, i.e. 0.15 G-0.24 G. If the lateral acceleration detected by the accelerometer is greater than the lateral acceleration threshold value, and the pedal event is determined to be a panic braking event, then a precharge command signal is transmitted to the brake system on the vehicle to cause air chambers in the brake system to fill so that air is available in advance of the braking event.

When using yaw in conjunction with an identified panic braking event, the yaw threshold may be set to, e.g., 50%-80% of an automatic braking intervention threshold. In one example, the yaw threshold is set to be 20% below the value that will trigger stability intervention. Yaw is calculated against the existing travel direction of the vehicle. The system detects yaw error between the desired direction of travel from a steering angle sensor 46 and the actual yaw of the vehicle. If the yaw error calculated is greater than the yaw threshold value, then a precharge signal is transmitted to the brake system on the vehicle to cause air to cause air to be available at the modulators in advance of the panic braking event.

FIG. 3 illustrates a method for precharging a brake system in a commercial vehicle for stability control in accordance with one or more features described herein. At 120, stability input information (e.g., lateral acceleration information, yaw information, etc.) is received from an accelerometer. At 122, the stability input is compared to a first predetermined stability input threshold. If the stability input does not exceed the first predetermined stability input threshold, then the method reverts to 120 for continued monitoring. If the stability input exceeds the first predetermined stability input threshold, then at 124, a command is sent to the brake system to precharge the brake circuit.

At 126, the stability input is compared to a second predetermined stability input threshold, which is greater than the first predetermined stability input threshold. If the value of the stability input is greater than the second predetermined threshold, then at 128, a command is sent to cause the brakes to be applied. If the stability input is not greater than the second predetermined input, then at 130, a determination is made regarding whether the stability input value has fallen below the first predetermined threshold and remained there for a predetermined time period (T1) (e.g., 2 seconds or some other suitable time period, or whether the stability input value has fallen all the way below a third predetermined threshold that is lower than the first predetermined threshold. If either of these conditions is met, then at 132, precharged air is released to the atmosphere. If neither condition is met, then the method reverts to 126 for continued monitoring.

FIG. 4 illustrates a method for precharging a brake system in a commercial vehicle for stability control in accordance with one or more features described herein. At 140, adaptive cruise control (ACC) input information (e.g., following distance, following time, etc.) is received from a forward sensor (e.g., camera, radar, etc.) on the vehicle. At 142, the ACC input is compared to a first predetermined ACC input threshold (e.g., 30 feet, 2 seconds, or some other suitable following distance or following time threshold). If the ACC input does not exceed the first predetermined ACC input threshold, then the method reverts to 140 for continued monitoring. If the ACC input exceeds the first predetermined ACC input threshold, then at 144, a command is sent to the brake system to precharge the brake circuit.

At 146, the ACC input is compared to a second predetermined ACC input threshold, which is greater than the first predetermined ACC input threshold. If the value of the ACC input is greater than the second predetermined threshold, then at 146, a command is sent to cause the brakes to be applied. If the ACC input is not greater than the second predetermined input, then at 148, a determination is made regarding whether the ACC input value has risen above the first predetermined threshold and remained there for a predetermined time period (T2) (e.g., 2 seconds or some other suitable time period), or whether the ACC input value has risen all the way above a third predetermined threshold that is higher than the first predetermined threshold. If either of these conditions is met, then at 150, precharged air is released to the atmosphere. If neither condition is met, then the method reverts to 146 for continued monitoring.

Figure 5:
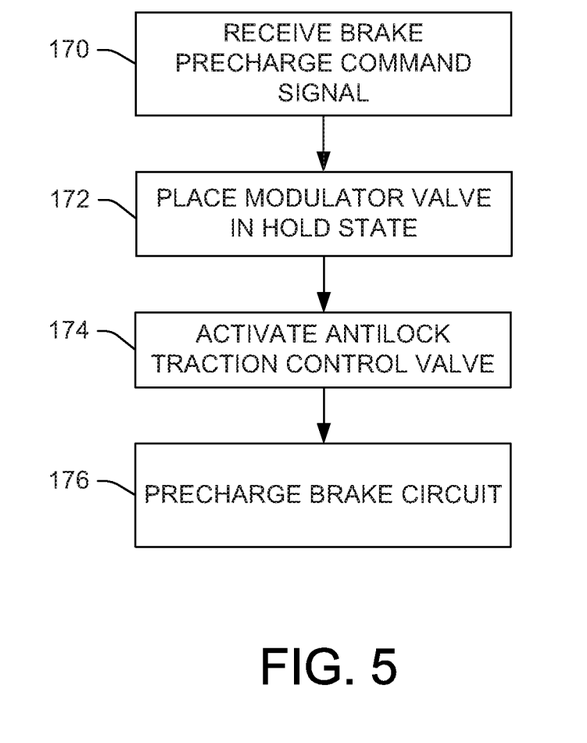
FIG. 5 illustrates a method for precharging a brake system in a commercial vehicle, in accordance with various aspects set forth herein.

FIG. 5 illustrates a method for precharging a brake system in a commercial vehicle, in accordance with various aspects set forth herein. At 170, a precharging control signal is received by the brake system. At 172, the brake system places one or modulator valves in a "hold" state. At 174, an antilock traction relay valve is activated. At 176, the brake system is placed in a precharged state so that brake pressure is available to stabilize the vehicle in advance of a braking event.

Figure 6:
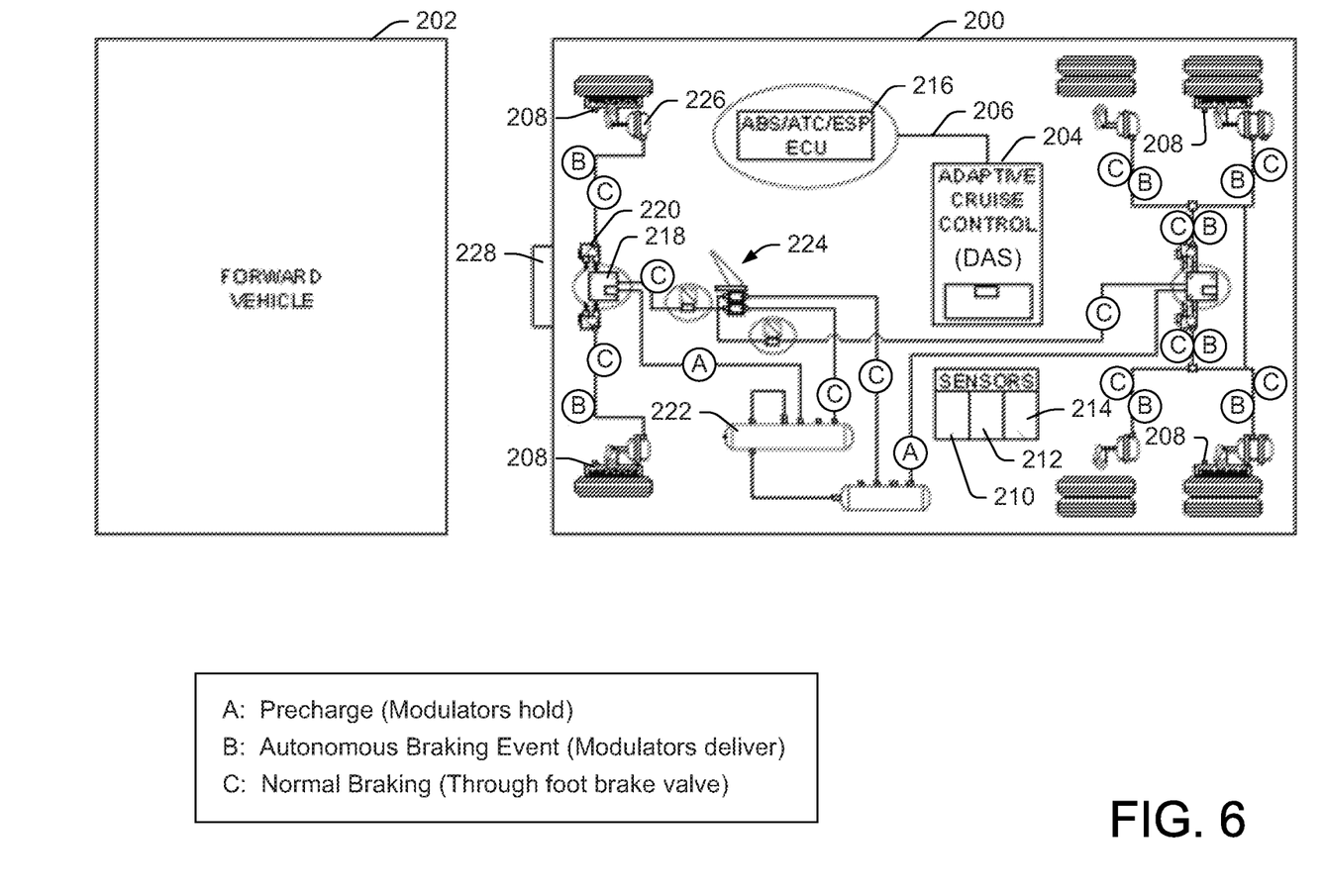
FIG. 6 illustrates a component diagram of an exemplary vehicle (e.g., a host vehicle), traveling on a path (e.g., a road) behind a forward vehicle, in accordance with various features described herein.

With reference to FIG. 6, a simplified component diagram of an exemplary vehicle 200 (e.g., a host vehicle), traveling on a path (e.g., a road) behind a forward vehicle 202, is illustrated in accordance with various features described herein. The system shown in FIG. 4 may be used in conjunction with any of the features or embodiments described herein with regard to FIGS. 1-5.

Although the vehicle 200 is illustrated as a straight vehicle (e.g., a straight truck), it is to be understood that the vehicle 200 may also be an articulated vehicle (e.g., an articulated truck) including one or more trailers. The vehicle 200 includes one or more vehicle control systems. In one embodiment, one of the vehicle control systems is an adaptive control with braking (ACB) cruise control system, which includes an adaptive cruise controller 204, also referred to herein as a driver assistance system (DAS). The adaptive cruise controller 204 is electrically connected to a vehicle communication bus 206. At least one sensor is included on the vehicle 200. In one embodiment, the vehicle 200 includes one or more speed sensors 208, a yaw rate sensor 210, a lateral acceleration sensor 212, and a steering angle sensor 214. However, other embodiments including additional vehicle sensors are also contemplated.

Although it is not illustrated, in one embodiment each of the sensors 208, 210, 212, 214 electrically communicates with the vehicle communication bus 206. In this embodiment, it is contemplated that any messages transmitted between the sensors and one or more vehicle controllers, via the communication bus 206, is compatible with the J1939 standard. However, other embodiments, in which one or more of the sensors directly communicates with one or more vehicle controllers without being transmitted over the vehicle communication bus (e.g., the speed sensor directly communicates with the adaptive cruise controller) are also contemplated. In these other embodiments, it is contemplated that messages transmitted directly between the sensors and vehicle controllers may or may not be J1939 compatible. If a message is not J1939 compatible, it is contemplated that a message transmitted between a sensor and a vehicle controller conveys information as, for example, an electrical signal. In one embodiment, one of the other vehicle control systems on the vehicle 200 is an anti-lock braking system (ABS), which includes an ABS controller 216.

A pre-charged state is achieved when traction valve 218 is activated and modulators 220 are set to hold state. Air is provided directly from air reservoir 222 to the traction valve 218 and does not require brake pedal 224 activation. This pathway is labeled "A" in FIG. 6.

A fully actuated state (e.g., for automatic braking) is achieved when traction valve 218 is activated, modulators 220 are set to build state, and brake chambers 226 have pressure, thus generating braking force. This pathway is labeled "B" in FIG. 6.

A normal state is achieved when traction valve 218 is deactivated, and modulator 220 is set to a build state. This pathway is labeled "C" in FIG. 6.

The brake precharge command causes air transmission lines, valves, modulators in the brake system to be precharged to make air available for braking by placing ABS modulator valve(s) in a "hold" state while activating an antilock traction valve by opening the valve from supply to delivery, thus precharging the brake system at the modulator valves which are located nearest the wheel end and brake assemblies, thus shortening the time to actually apply the brakes if autonomous braking or driver intervention is necessary.

To exit precharge, the traction valve deactivates and exhausts the air to atmosphere. Precharge will be held for a predetermined time after the detection of yaw/lateral acceleration at or above the threshold level begins, such as two seconds. If yaw and lateral acceleration conditions continue to be met, precharge is maintained. However, if values go below about, e.g., 50% of intervention threshold and time greater than e.g., 2 seconds (or some other predetermined time period) elapses, the system exits precharge.

In one embodiment, the driver assistance system (DAS) 204 is employed with a radar and/or a camera sensor 228, and can monitor and control the time and distance between the host vehicle 200 and the forward vehicle 202 or a stationary object. The DAS can perform automatic braking functions in a situation where either a time to collision is estimated to be too low or the absolute following distance may be too low. In this situation, air may be pre-charged if the time to collision or following distance reaches a threshold that is lower than the intervention threshold for brake force. If, for example, brake force is requested when the time to collision is 1.5 seconds, then the system can pre-charge the air until time to collision is, e.g., 1.2 seconds or less, such that air pressure is more readily available if/when the brake force threshold is achieved.

The DAS can also operate in an autonomous mode where it intends to maintain a small following distance. In this situation, the air system can be pre-charged and maintain a pre-charged state such that vehicle system air pressure is available at the wheel end modulator valve, such that the control system can deliver air to the brake chambers at a reduced time, resulting in faster generation of wheel-end brake force if/when the intervention threshold is achieved. In this situation, the intervention threshold can be a time to collision, absolute distance or an external brake command from the forward vehicle.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A system that facilitates pre-charging an air brake system on a commercial vehicle, comprising:
   sensor that detects a stability input value of the vehicle; and
   a processor configured to:
   compare the stability input value of the vehicle to a first predetermined threshold;
   when the stability input value of the vehicle exceeds the first predetermined threshold, send a precharge command to the brake system to charge one or more circuits of the brake system, wherein the precharge command comprises instructions to place one or more antilock brake modulators into a hold state, and an antilock traction relay valve into an energized state in order to precharge the brake system.

2. The system according to claim 1, further comprising a pedal sensor that detects a pedal event in the commercial vehicle, the pedal event triggering a decrease in vehicle speed.

3. The system according to claim 2, wherein the processor is further configured to:
   compare a magnitude of the pedal event as measured by the pedal sensor to a second predetermined threshold; and
   when the rate of travel of the pedal exceeds the second predetermined threshold, send a command to the brake system to transmit the precharged air to the one or more air chambers.

4. The system according to claim 2 wherein the pedal sensor is a travel sensor that detects a rate of travel of the pedal during the pedal event.

5. The system according to claim 2, wherein the pedal event is an actuation of a brake pedal.

6. The system according to claim 2, wherein the pedal event is a deactivation of an accelerator pedal.

7. The system according to claim 1, wherein when the first predetermined threshold is lower than an autonomous braking intervention threshold above which automatic braking is triggered.

8. The system according to claim 7, wherein the first predetermined threshold is in the range of 50% to 80% of the autonomous braking intervention threshold above which automatic braking is triggered.

9. The system according to claim 7, wherein the sensor is one of an accelerometer, a yaw rate sensor, and a forward vehicle sensor, and wherein the autonomous braking intervention threshold respectively is one of a lateral acceleration threshold, a yaw threshold, and a following distance threshold.

10. The system according to claim 7, wherein the autonomous braking intervention threshold above which automatic braking is triggered is a lateral acceleration threshold of approximately 0.3 G.

11. A processor that facilitates pre-charging an air brake system on a commercial vehicle, the processor being configured to:
    compare a stability input value of the vehicle to a first predetermined threshold;
    when the stability input value of the vehicle exceeds the first predetermined threshold, send a precharge command to the brake system to charge one or more circuits of the brake system, wherein the precharge command comprises instructions to place one or more antilock brake modulators into a hold state, and an antilock traction relay valve into an energized state in order to precharge the brake system.

12. The processor according to claim 11, wherein the first predetermined threshold is in the range of 50% to 80% of an autonomous braking intervention threshold above which automatic braking is triggered.

13. The system according to claim 12, wherein the autonomous braking intervention threshold is one of a lateral acceleration threshold, a yaw threshold, and a following distance threshold.

14. The processor according to claim 13, wherein the autonomous braking intervention threshold above which automatic braking is triggered is a lateral acceleration threshold of approximately 0.3 G.

15. The processor according to claim 11, wherein the processor is further configured to:
    compare a magnitude of a pedal event as measured by a pedal sensor to a predetermined brake pedal rate threshold; and
    when a rate of travel of the pedal exceeds the predetermined brake pedal rate threshold, send a command to release the precharged air.

16. The processor according to claim 15, wherein the pedal sensor is a travel sensor that detects a rate of travel of the pedal during the pedal event.

17. The processor according to claim 15, wherein the pedal event is one of an actuation of a brake pedal and a deactivation of an accelerator pedal.

18. A method of precharging an air brake system on a commercial vehicle, the method comprising:
    comparing a stability input value of the vehicle to a first predetermined threshold; and
    when the stability input value of the vehicle exceeds the first predetermined threshold, sending a precharge command to the brake system to charge one or more air modulators of the brake system, wherein the precharge command comprises instructions to place one or more antilock brake modulators into a hold state, and an antilock traction relay valve into an energized state in order to precharge the brake system.

19. The method according to claim 18, wherein the first predetermined threshold is in the range of 50% to 80% of an autonomous braking threshold above which automatic braking is triggered.

20. The system according to claim 19, wherein the autonomous braking intervention threshold is one of a lateral acceleration threshold, a yaw threshold, and a following distance threshold.

21. The method according to claim 19, wherein the autonomous braking intervention threshold is a lateral acceleration threshold of approximately 0.3 G.

22. The method according to claim 18, further comprising:
 comparing a magnitude of a pedal event as measured by a pedal sensor to a predetermined brake pedal rate threshold; and
 when a rate of travel of the pedal exceeds the predetermined brake pedal rate threshold, sending a command to the brake system to apply the brakes.

23. The method according to claim 22, wherein the pedal sensor is a travel sensor that detects a rate of travel of the pedal during the pedal event.

24. The method according to claim 22, wherein the pedal event is one of an actuation of a brake pedal and a deactivation of an accelerator pedal.

25. An apparatus that facilitates pre-charging an air brake system on a commercial vehicle, comprising:
 means for detecting a stability input value of the vehicle;
 means for comparing the stability input value of the vehicle to a first predetermined threshold; and
 means for sending a precharge command to the brake system to charge the brake system when the stability input value of the vehicle exceeds the first predetermined threshold, wherein the precharge command comprises instructions to place one or more antilock brake modulators into a hold state, and an antilock traction relay valve into an energized state in order to precharge the brake system.

26. The apparatus according to claim 25, further comprising:
 means for detecting a pedal event in the commercial vehicle, the pedal event triggering a decrease in vehicle speed;
 means for comparing a magnitude of the pedal event as measured by the means for detecting the pedal event to a predetermined brake pedal rate threshold; and
 means for sending a command to the brake system to release the precharged air when the rate of travel of the pedal exceeds the second predetermined threshold.

\* \* \* \* \*